UNITED STATES PATENT OFFICE.

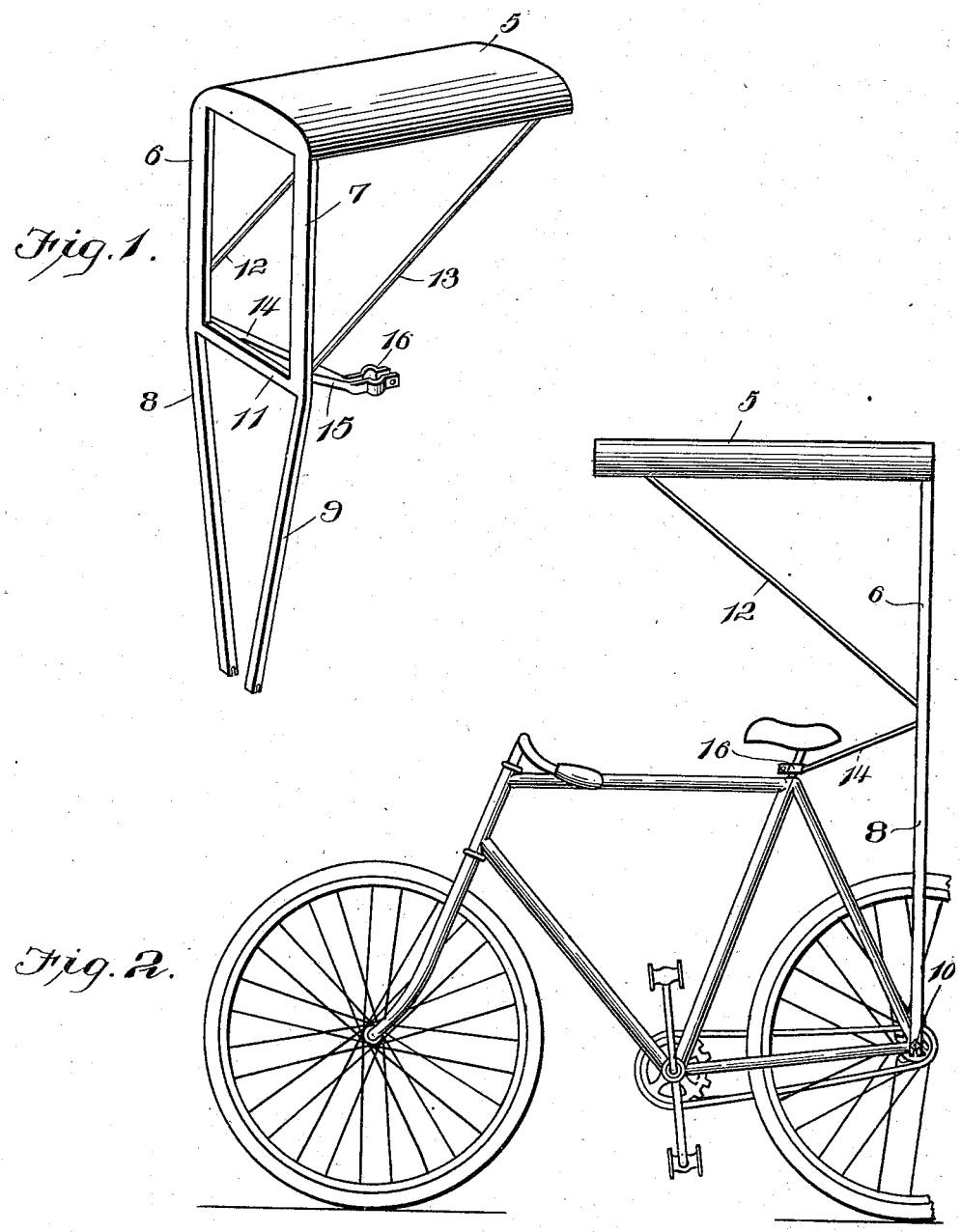

MARTIN ZECH, OF PRAIRIE DU SAC, WISCONSIN.

BICYCLE-CANOPY.

SPECIFICATION forming part of Letters Patent No. 726,610, dated April 28, 1903.

Application filed September 30, 1901. Serial No. 77,095. (No model.)

*To all whom it may concern:*

Be it known that I, MARTIN ZECH, a citizen of the United States, residing at Prairie du Sac, in the county of Sauk, State of Wisconsin, have invented certain new and useful Improvements in Bicycle-Canopies; and I do hereby declare the following to be a full, clear, and exact description of the invention, such as will enable others skilled in the art to which it appertains to make and use the same.

This invention relates to canopies for bicycles and similar wheels; and it has for its object to provide a cheap and simple construction that will be light and which may be easily and quickly applied and removed, a further object of the invention being to provide a canopy which will be most efficient.

A further object is to provide a canopy which may be attached to either the front or rear portion of the bicycle, as desired.

In the drawings forming a portion of this specification, and in which like numerals of reference indicate similar parts in the several views, Figure 1 is a perspective view of the canopy detached from a bicycle. Fig. 2 is a side elevation showing a bicycle with the canopy in place.

Referring now to the drawings, it will be seen that the canopy comprises a top or roof 5, having a suitable waterproof covering, and at the rear end of which are the depending members 6 and 7, which are connected rigidly with the roof, and the upper portions of which stand parallel and are separated by an interspace, as shown, to permit of ventilation. The lower portions 8 and 9 of the members 6 and 7 converge and have their lower ends bifurcated to engage over the axle of the bicycle-wheel. It will be understood that the specific arrangement of parts in the present invention, as mentioned above, is designed to produce a canopy which may be attached to either the front or rear portion of a bicycle. Should it be desired to accomplish the latter, the members 6 and 7 are disposed with their bifurcations engaged over the rear axle 10 of a bicycle and exterior to the rear forks in such positions as to be impinged against by the rear-axle nuts, which act to clamp the members to the frame of the bicycle.

The parallel portions of the members 6 and 7 are somewhat wider than the lower portions thereof, and connecting the lower ends of the parallel portions is the cross-brace 11, and connected to the converging portions 8 and 9 directly below the cross-piece are the slanting braces 12 and 13, which are connected to the under edges of the sides of the roof of the canopy near to the forward ends thereof.

To prevent forward or backward pivotal movement of the canopy upon the rear axle as a pivot, the braces 14 and 15 are provided and are connected to the portions 8 and 9 directly below the braces 12 and 13, the braces 14 and 15 being converged to meet and having a clip 16 at their meeting ends, which is engaged around the seat-post of the bicycle when the canopy is in place.

In attaching the canopy to the front of the bicycle the bifurcations of the members 6 and 7 are engaged over the front axle in the same manner as that just described in connection with the rear axle, and the clip 16 is engaged around the handle-bar above the head of the bicycle. It will be seen that this arrangement does not interfere in any way with the steering of the machine.

When the canopy is to be removed, the clip is disengaged from the seat-post, and the rear-axle nuts having been loosened the bifurcated lower ends of the convergent portions of the members 6 and 7 are disengaged from the rear axle.

What is claimed is—

As an article of manufacture, a bicycle-canopy adapted for attachment to a wheel-axle of a bicycle, comprising a roof, a pair of uprights having their upper portions parallel and connected to the corners of the roof, the portions of the uprights below the parallel portions being converged and notched and adapted for removable engagement over a wheel-axle of a bicycle, a cross-brace connecting the uprights at the lower ends of the parallel portions, braces connected to the sides of the roof adjacent to the edge thereof and to the lower ends of the parallel portions of the uprights and additional braces connected to the lower ends of the parallel portions of the uprights, the last-mentioned braces being converged downwardly and away from the uprights and having their free ends adapted to engage around to an upright portion of a bicycle and provided with perforations to receive a clamping-bolt.

In testimony whereof I affix my signature in presence of two witnesses.

MARTIN ZECH.

Witnesses:
MAX H. NINMAN,
CHAS. F. NINMAN.